(No Model.)　　　　　　　　　　　　　　　　3 Sheets—Sheet 1.
C. E. COE.
SORGHUM AND CORN CUTTER.

No. 306,322.　　　　　　　　　　Patented Oct. 7, 1884.

WITNESSES:
Thos Houghton.
W. L. Stevens.

INVENTOR:
Chas. E. Coe
BY Munn & Co
ATTORNEYS.

(No Model.)  C. E. COE.  3 Sheets—Sheet 2.
SORGHUM AND CORN CUTTER.
No. 306,322.  Patented Oct. 7, 1884.
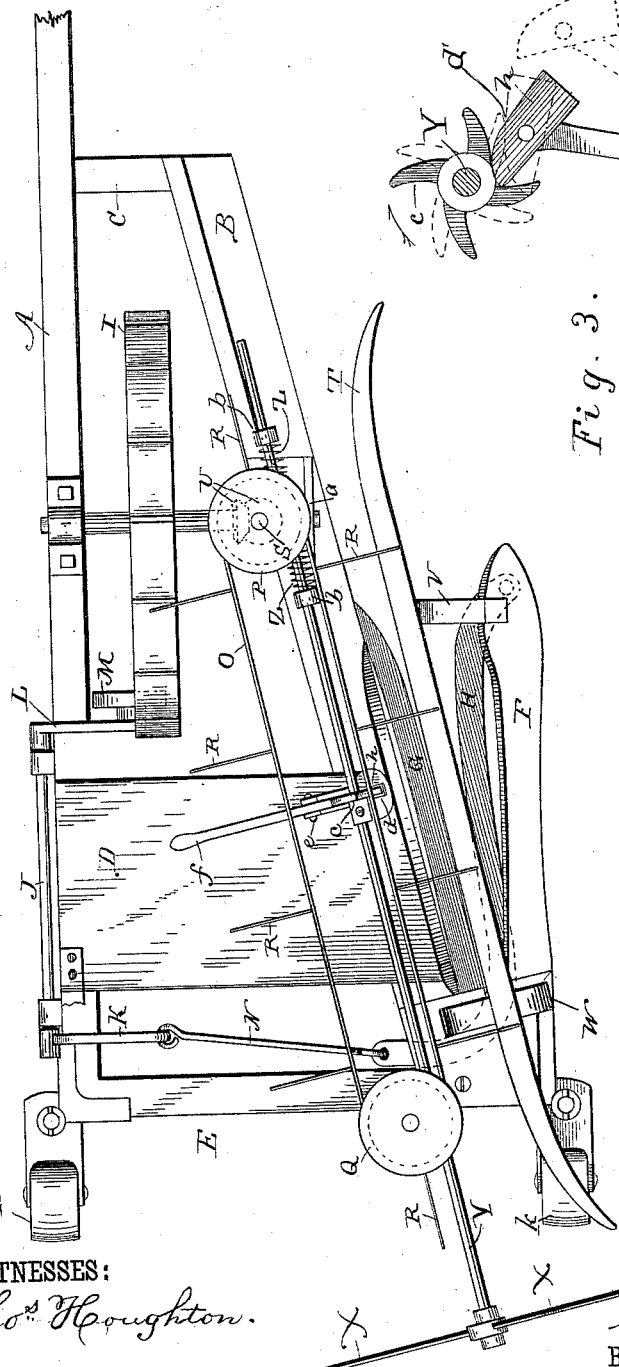
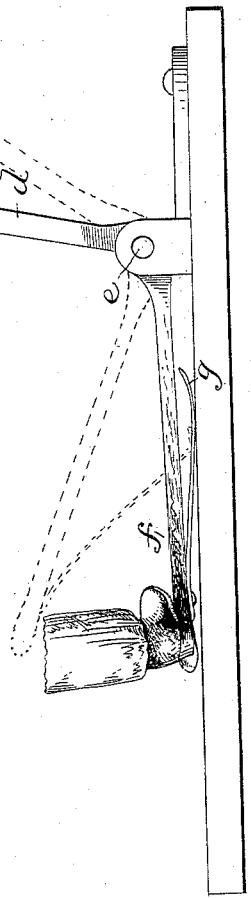
WITNESSES:
Thos. Houghton.
W. X. Stevens.
INVENTOR:
Chas. E. Coe
BY Munn & Co.
ATTORNEYS.

(No Model.) 3 Sheets—Sheet 3.

C. E. COE.
SORGHUM AND CORN CUTTER.

No. 306,322. Patented Oct. 7, 1884.

WITNESSES:
Thos. Houghton.
N. X. Stevens.

INVENTOR:
Chas. E. Coe
BY Munn & Co
ATTORNEYS.

UNITED STATES PATENT OFFICE.

CHARLES E. COE, OF LEESBURG, KANSAS.

SORGHUM AND CORN CUTTER.

SPECIFICATION forming part of Letters Patent No. 306,322, dated October 7, 1884.

Application filed September 8, 1883. (No model.)

*To all whom it may concern:*

Be it known that I, CHARLES E. COE, a citizen of the United States, residing at Leesburg, in the county of Stafford and State of Kansas, have invented a new and useful Improvement in Sorghum and Corn Cutters, of which the following is a specification.

This invention relates to that class of sorghum-cutters which are drawn across a field to cut standing stalks of sorghum, corn, sugarcane, &c.

The object of the invention is to provide means whereby standing stalks may be cut and dropped in bunches.

The invention consists in a shearing mechanism, means whereby the act of advancing the machine upon the ground will operate the shears to cut the stalks, means for laying the stalks as fast as they are cut to form a bunch, means for holding said stalks until the bunch is large enough, and means for dropping the same at the will of the operator, as hereinafter described and claimed, reference being had to the accompanying drawings, in which—

Figure 1:
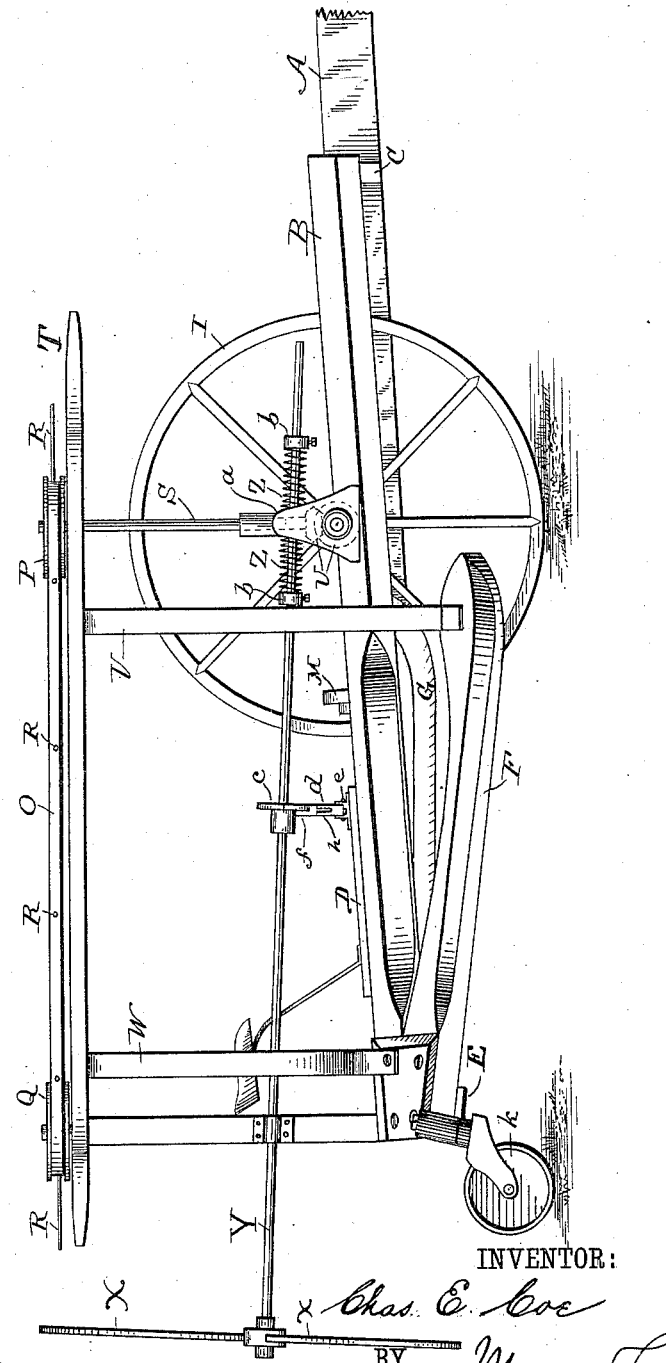
Figure 4:
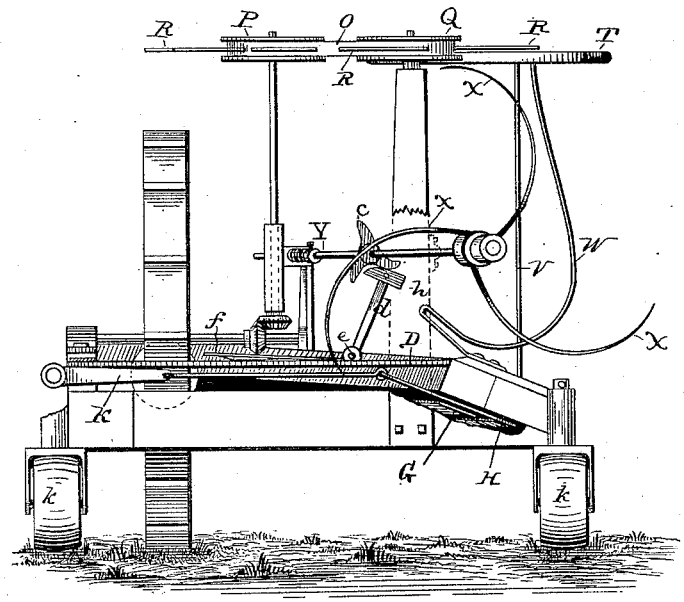
Figure 5:
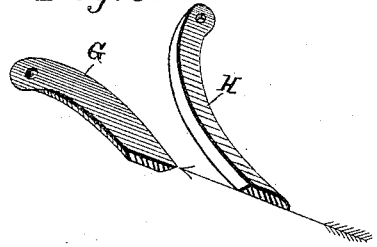

Figure 1 is a side elevation, and Fig. 2 is a plan view, of my invention. Fig. 3 is a detail view. Fig. 4 is a rear elevation of my invention. Fig. 5 is a perspective view, partly in section, of the cutting-blades.

A is the team-pole, which extends backward to serve as the main beam of the frame.

B is the opposite side beam, attached to bar A by means of cross-pieces C, D, and E.

F is an arm rigidly secured at its rear end to the frame.

G is one blade of the shears, rigidly bolted to the frame. H is the other shear-blade, pivoted at its heel to the forward end of arm F, to oscillate in contact with its mate G. This oscillation is produced by the revolution of the main wheel I as it advances along the ground by means of a rock-shaft, J, journaled on the frame, having two arms, K and L, the arm K being connected to the rear end of blade H by a rod, N, and the arm L provided with a roller, M, whose weight causes it to fall into the path of the arms of wheel I. This falling of arm L, in connection with the resistance of standing stalks to the advance of the machine, opens the shears, and the rising of the arm by the action of each succeeding spoke of the wheel closes the shears and cuts off the interposed stalks. The beam B is set slanting to the line of travel, to guide standing stalks into the shears. The plane of the shears slants across the line of travel, to adapt them to cut the stalks to the greatest advantage.

O is a belt traveling around pulleys P Q, to carry back the tops of the stalks by means of fingers R, fixed at one end in said belt. The belt is carried by pulley P, which is fixed on the vertical shaft S, engaged by beveled gears U to revolve continually with the shaft of the main wheel I.

T is a guide-rail supported on two springing uprights, V and W, to pack the tops of the stalks together. Upright V is secured at its lower end upon the forward end of arm F. Upright W is secured to the frame, and is bent, forming one rib of a cradle to receive and support the butt-ends of the stalks when tripped by it in being carried back by the fingered belt. The tops of the stalks are received as they fall from the belt on being tripped over cradle or upright W by one of the arms X. These arms are secured to a shaft, Y, which revolves in bearings in the frame, and is provided with two springs, Z, acting between one of its bearings, $a$, and two collars, $b$, on it, to give it longitudinal flexibility. Arms X are kept from rotating under the weight of accumulating stalks by means of a wheel, $c$, having as many teeth as there are arms X secured upon shaft Y, to be engaged by a detent, $d$, pivoted to the frame at $e$, and provided with a foot-lever, $f$, spring $g$, and hand $h$. Pressure of the foot on lever $f$ holds hand $h$ engaged with a tooth of the wheel. Removal of the foot allows spring $g$ to throw up lever $f$ and disengage hand $h$, leaving arms X free to turn and drop their bunch of stalks. Hand $h$ is pivoted to detent $d$, and is so shaped as to hold a tooth of wheel $c$ firmly; yet when the act of releasing the wheel takes place the hand tips so as to gradually let go its hold on the tooth, to prevent strain and wear on the machine. This is necessary on account of the considerable weight of green stalks which the arms X have to hold, for if a mere notch and pawl, like a gun-tumbler and its trigger, and the parts were made in the manner common to agricultural implements— that is, cast ready to go together without smoothing up—the edges of the pawl and tooth would both be soon worn so that they would not hold, or the tooth must be so deep that the spring *g* could not liberate the pawl under a load. The teeth of wheel *c* and the hand *h* are both rounded to roll together when coming in contact, as shown in Fig. 3, and to roll apart by the farther tipping down of hand *h* when it is being withdrawn. The shaft Y will be stopped from revolving when a portion of one of its teeth near the out end rests on the hand *h* at a point directly over the detent *d*, as shown in dotted lines *d'*. This rolling together and apart of the pawl and teeth prevents shock and rubbing wear. The longitudinal flexibility of shaft Y is to permit it to yield endwise and disengage wheel *c*, so that arms X may turn and escape in case one of them gets caught on stubble or other obstruction. The rail T is arranged at a proper height to support the out ends of the teeth in case any stalk rides on them; but when the belt passes around its rear pulley the teeth will be withdrawn from such support and bend down, permitting their load to fall into the cradle. The main weight of the frame is supported on the drive-wheel; but to keep it from tipping, it is provided with two caster-wheels, K, one at each of the rear corners.

What I claim as my invention, and wish to secure by Letters Patent, is—

1. In a sorghum-cutter, the combination, with the team-pole forming one side of the frame, of the beam opposite, secured at an angle thereto by means of cross-bars longer at the rear than at the front, and an outside arm secured at its rear end to said angular beam at or near its rear end, and forming an angle therewith opening forward, as shown and described.

2. The combination, with a frame having one of its side beams at an angle with the line of travel, and an outer arm secured at one end thereto, forming an angle opening forward, of a pair of shear-blades secured along the sides of said open angle, one of said blades being rigidly secured at both ends to either the said beam or arm, and the other blade pivoted to the opposite one of the two parts, near the forward part of the angle between them, its rear end being free to oscillate, as shown and described.

3. The combination, with a drive-wheel provided with spokes, and shear-blades attached to a frame carried by said wheel, of a rock-shaft journaled to said frame and provided with two arms, one of which is connected with a movable blade of the shears, and the other is adapted to fall of its own weight upon the spokes of the wheel, and be raised by each of said spokes to operate the shears, as described.

4. The combination, with a belt provided with fingers adapted to rotate in a horizontal plane, of an opposite rail secured upon the machine, adapted to support the ends of the said fingers sliding thereon, and to guide the tops of stalks thereby carried, as shown and described.

5. The combination, with a frame, means attached thereto for cutting stalks, and means for carrying the butt-ends of the stalks, of a shaft journaled longitudinally in and extending to the rear of said frame, curved arms secured to the rear end of said shaft, a wheel secured to the same shaft, having teeth corresponding to the number of said curved arms, a detent adapted to engage said toothed wheel, and a treadle operating said detent, whereby the same may be held in engagement with the toothed wheel by the driver's foot, or be released to escape from such engagement, as specified.

6. The combination, with the toothed wheel *c*, of detent *d*, having a treadle end, *f*, and the hand *h*, pivoted to said detent, adapted to rock to different positions in the act of releasing said wheel, as described.

7. The shaft Y, the arms X, and toothed wheel *c* thereon, and a detent adapted to engage wheel *c*, in combination with the collars *b*, the bearing *a*, and the spring Z, acting between said bearing and collars, as shown and described.

CHARLES E. COE.

Witnesses:
WILLIAM DIXON,
HY. ROHN.